United States Patent [19]

Payne

[11] 4,140,484

[45] Feb. 20, 1979

[54] REFRACTORY SHEATHING

[75] Inventor: Derick A. Payne, Hooton, England

[73] Assignee: Morgan Refractories Limited, Wirral, England

[21] Appl. No.: 820,742

[22] Filed: Aug. 1, 1977

[30] Foreign Application Priority Data

Aug. 4, 1976 [GB] United Kingdom ............... 32523/76

[51] Int. Cl.[2] ............................ F27D 3/02; F16L 9/14

[52] U.S. Cl. ...................................... 432/234; 138/147

[58] Field of Search .......................... 432/234; 138/147

[56] References Cited

U.S. PATENT DOCUMENTS

| | | | |
|---|---|---|---|
| 2,749,107 | 6/1956 | Corriston | 432/234 |
| 4,071,311 | 1/1978 | Errington | 432/234 |

FOREIGN PATENT DOCUMENTS

| | | | |
|---|---|---|---|
| 1342891 | 1/1974 | United Kingdom | 432/234 |

*Primary Examiner*—John J. Camby

*Attorney, Agent, or Firm*—Larson, Taylor and Hinds

[57] ABSTRACT

A metal tubular supporting member in a furnace sheathed by refractory sheathing comprising an inner layer of fibrous refractory material and an outer layer of refractory tiles held in place by metal links which are secured together around the furnace member and have radial studs which extend through the inner layer into socket holes in the tiles so that the metal fittings can first be secured to the furnace member and then covered by the fibrous refractory material and the tiles which are engaged with the radial studs.

2 Claims, 2 Drawing Figures

REFRACTORY SHEATHING

Figure 2:
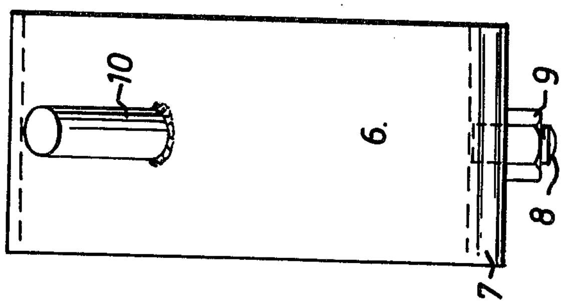

This invention relates to refractory insulation for furnace members made of metal and sheathed with refractory materials, in particular horizontal pipes and especially skid rails of water-cooled supporting structures for stock under treatment in a furnace.

The invention is especially suitable for the skid rails along which stock is moved in reheat furnaces for ferrous slabs and will be described as applied thereto but application of the invention to tubular supporting rails themselves and to other tubular metal members in furnaces where similar conditions exist is not precluded.

In a reheat furnace, slabs must be heated to a very high temperature, for example 1260° C., as uniformly as possible and the slabs are therefore moved, by pushers or walking beams, along raised skid rails, usually water-cooled hollow rails supported by a structure, like a gantry, of water-cooled hollow members while they are heated from above and below by intensely hot gas blast from burners.

The supporting structure is directly in the path of the hot gas and, as well as being water-cooled, the hollow rails and supports are sheathed with refractory material.

The present invention provides a tubular metal member in a furnace with sheathing of the kind comprising an inner layer of refractory fibrous material and an outer layer of refractory tiles held in place by engagement with projections from metal fittings on the furnace member.

In known sheathing of the above kind difficulty is experienced in providing metal fittings which can be satisfactorily secured to the furnace member and will hold the tiles in place under working conditions.

The welding of the metal fittings to the furnace members has been tried but is very expensive in the initial construction costs, involves difficult and arduous work if replacements have to be made and, with the risk of imperfect welds, failure in service is not infrequent.

Also there have been proposed pre-fabricated sheathing units in which the metal fittings are incorporated with the refractory tiles by anchors embedded in the tiles. These units however must be relatively heavy to handle and support in place while they are being secured to a furnace member and their securing means require access to be provided through or between the tiles and the use of a poured or mouldable refractory material to complete the sheathing.

The present invention provides metal fittings which can first simply be secured to the furnace member, without welding, and are amply protected by the refractory components of the sheathing without requiring added refractory material, other than a relatively small amount of mortar if desired.

According to the invention, in sheathing of the above kind, the metal fittings comprise pairs of metal links which respectively fit around opposite sides of the furnace member and at one end only are held together by their ends interengaging with securing means which when loosened allow the links to be spread apart to pass on to the furnace member and when tightened clamp the links together to embrace tightly around the furnace member, the projections being substantially radial studs which extend through the inner layer of fibrous refractory material into engagement, effected after assembly of the links and inner layer on the furnace member, with socket holes in the tiles.

The invention provides the important technical advantages that the sheathing is easy to instal without welding or the in situ forming of refractory material, the tiles are positively held in place, and are also cushioned and damped, against the loosening effects of vibration, by the resilient inner layer of fibrous material. Consequently the sheath as a whole is securely held in place but is cushioned against the effects of vibration and shock.

Usually, the links and tiles are segments of a circular cylinder but they could be of other tubular or annular shape, of any suitable continuous or polygonal cross-sectional outline. The invention is for example suitable for a tubular member of substantially triangular cross-section.

Annular pairs of tiles, corresponding to the outline or sides of the cross-section of a required sheath, can be assembled in engagement with pairs of links as required, to form ring-sets around the inner layer of fibrous material, as many ring-sets being arranged in series along the rail or pipe as are required to cover its length. Tiles of adjacent ring-sets may be arranged in interfitting or staggered relationship, longitudinally adjacent tiles being of different circumferential extent or having borders shaped to interfit.

The joints between adjacent tiles in a ring-set, or between adjacent sets, may be simply butt-joints or of shouldered or other overlapping form.

The links may each consist of an arcuate metal band, strap or bar provided with substantially radial studs or equivalent projections, in the form of pins, lugs or prongs, to engage in socket holes provided at such angular location in the tiles that, when tiles are butted together over the links, the socket holes are presented at the same angular interval as the projections from the links so as to engage therewith. The socket holes in which the projections engage may be blind holes but are preferably countersunk on the outer side and filled with mortar when the sheath is installed.

Figure 1:
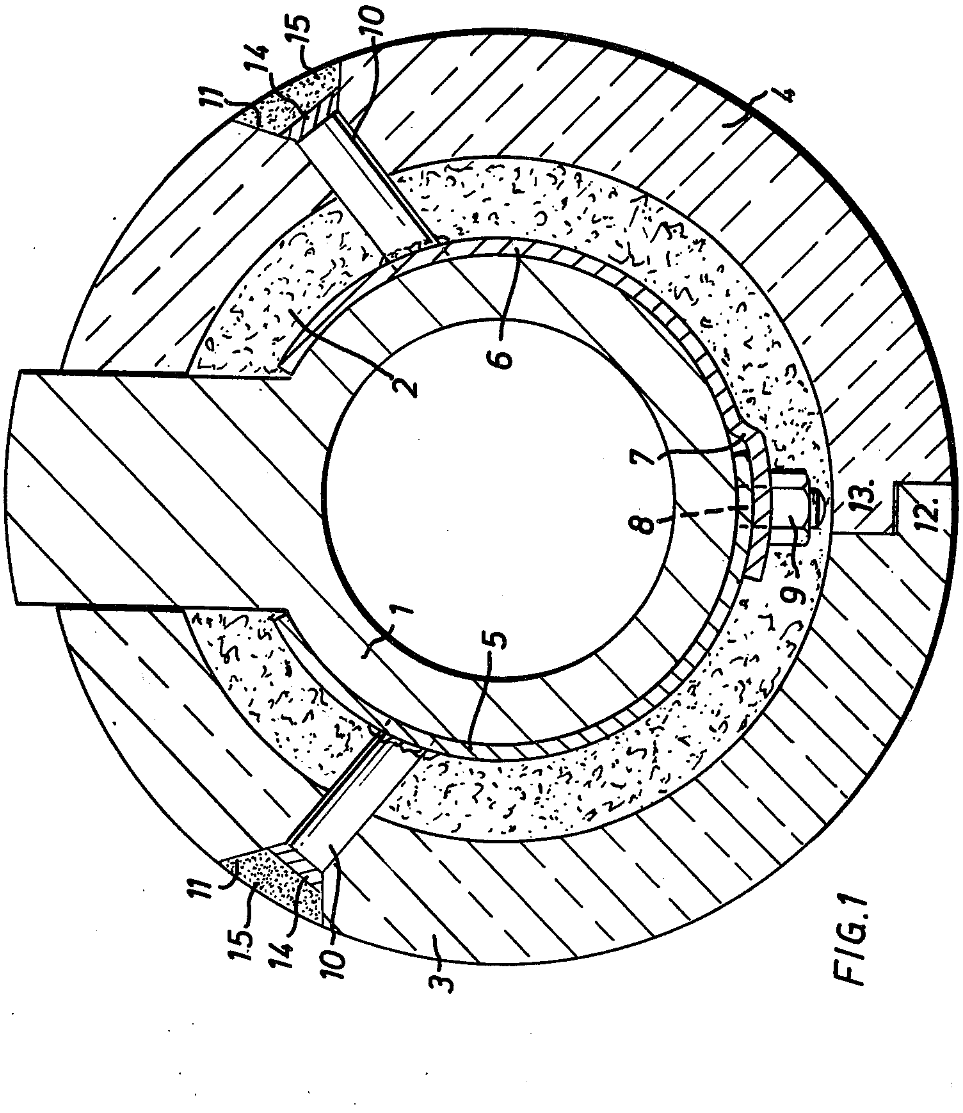

The invention is illustrated by way of example on the accompanying drawing, in which:

FIG. 1 is a cross-section of a skid rail with a refractory sheath according to the invention, FIG. 2 is a side elevation of a coupling link pair alone.

As shown by FIG. 1, a water-cooled tubular metal skid rail 1 has a refractory insulating sheath made up by an inner layer 2 of refractory fibrous material and an outer layer consisting of pairs of semi-cylindrical refractory tiles 3 and 4.

To hold each pair of tiles in place, a pair of metal coupling links 5 and 6 is placed, on installation of the sheath, to rest directly on the pipe 1. The lower ends of the links 5 and 6 interengage by a stepped overlap, the link 6 having a step 7, and their securing means comprise a screw threaded stud 8 on the one link 5 and a nut 9 which clamps the other link 6 on the stud for the links to embrace tightly around the rail 1. The stud and nut are covered by the inner fibrous layer 2 which is wrapped, like a blanket, around the pipe.

When the nut 9 is loosened the links 5 and 6 can be spread apart to be passed on to the rail 1 and when the nut is tightened it clamps the links together tightly embracing the rail.

Each link has a radially projecting stud 10 and each tile has a socket hole 11 therein so that the pair of tiles 3 and 4, butted together by their overlapping rebated ends 12 and 13 beneath the rail, present their holes 11 to match the studs 10 and engage therewith.

The coupling links may be of any required width and may have two or more studs, or equivalent projections, to engage with one or more tiles with multiple or single socket holes.

The socket holes 11 are preferably, as shown, countersunk, and plugged with refractory fibre 14 and mortar 15. Alternatively the tile holes may be blind holes, or recesses, not opening through to the outer surface of the tiles.

On installation in a furnace, the coupling links may be held in place, prior to wrapping with fibre and attachment of the tiles, by setting them in cement on the pipe. An air-setting cement, preferably of high thermal conductivity, would be suitable. Such cementing of the coupling links in place facilitates initial location and avoids subsequent displacement along the rail as a result of vibration.

Although the invention has been described as applied to coupling links to embrace a rail from beneath, the same principles could be applied to links designed to clasp around the upper half of a pipe. Such pairs of links, of an angular extent of more than 180°, could be clamped together at the top and present upward projections to be engaged by holes in tiles in a similar way to that shown.

I claim:

1. A tubular metal furnace member provided with refractory sheathing held in place by metal fittings around the furnace member, said metal fittings comprising a plurality of pairs of metal links, the links of each pair respectively being shaped to fit around opposite sides of the furnace member and being held together by one end only of each link interengaging with securing means acting upon both of said links, when loosened, said securing means allowing the links of the respective pair to be spread apart to be placed on to the furnace member and, when tightened, the securing means clamps the links of the pair together to embrace tightly around the furnace member, said links bearing projections which are substantially radial studs, and said refractory sheathing comprising an inner layer of fibrous refractory material and an outer layer of refractory tiles held in place by said projections extending through said inner layer into engagement with socket holes in said tiles.

2. A tubular metal furnace member according to claim 1, in which the studs extend only partly through the socket holes and are covered by refractory material.

* * * * *